No. 741,193. Patented October 13, 1903.

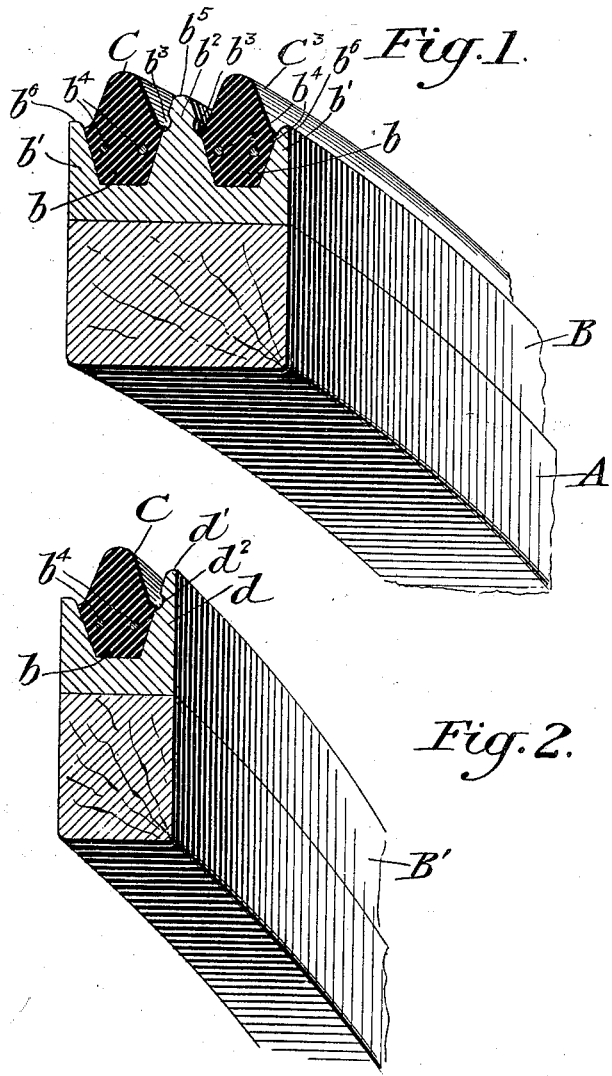

UNITED STATES PATENT OFFICE.

ALEXANDER TURKINGTON, OF LAFAYETTE, INDIANA.

WHEEL FOR VEHICLES.

SPECIFICATION forming part of Letters Patent No. 741,193, dated October 13, 1903.

Application filed July 25, 1903. Serial No. 166,945. (No model.)

*To all whom it may concern:*

Be it known that I, ALEXANDER TURKINGTON, a citizen of the United States, residing at Lafayette, in the county of Tippecanoe and State of Indiana, have invented certain new and useful Improvements in Wheels for Vehicles, of which the following is a specification.

The invention to be hereinafter described relates to wheels for vehicles, and more particularly to the tread-surface, which as the vehicle moves along the road contacts with the ground.

In motor-vehicles the power exerted for the propulsion of the vehicle is directly applied to turn the wheels in a rotary direction, thereby producing a tendency to slip upon the road-bed, which tendency is augmented by the sudden application of power, the character of the road, and weight of vehicle, resulting in a rapid wear of the tread-surface. To overcome this slipping tendency, as well also as to secure the elastic and cushion effect desired, rubber has been employed in the form of a tire, either as a solid, cushion, or an inflated tube. While the desirable qualities inherent in such forms of rubber tires are secured, yet they are found to wear rapidly, especially when in use on a high-speed vehicle and traveling along the ordinary road, the life of such tires under these circumstances being limited to a few weeks.

The present invention has for its object to provide a wheel for motor-vehicles which shall embody the advantages and desirable characteristics of wheels having cushion or pneumatic tires, as generally above pointed out, which shall take up the shock while moving over an uneven road-bed, wherein the excessive wear to the rubber tire shall be avoided and means be provided, as a supplemental tread-surface, to contact with the road-bed under excessive wearing conditions of the tire and fully support the vehicle should the tire become ruptured or be thrown from the wheel.

With these general objects in view my invention consists of a wheel having secured to the outer rim thereof a suitable metallic tire-support, said tire-support having a part projecting therefrom which under ordinary conditions of use and perfect tire will not contact with the ground, but which when the surrounding conditions make the wear upon the tire excessive will contact with the road-bed and taking up part of the traction action will relieve the wear upon the tire for the time being or until the conditions become changed as to speed, weight, or character of road-bed, when the tire again becomes the sole tread-surface.

In the drawings, Figure 1 is a sectional perspective view of a portion of a wheel embodying my invention in one of the best forms now known to me, and Fig. 2 is a like view of a modification.

Owing to the rapid wear of the rubber or other form of elastic or yielding tires I have found it desirable to provide a structure in which a plurality of such tires either of the same or different character may be employed and have embodied this preferred form of invention in a structure such as shown by Fig. 1, wherein A represents a part of the wheel, such as the felly, which may be of any usual or desired construction and to which is secured in appropriate or approved manner the tire-support B. The tire-support B comprises a metallic rim-like structure provided with a plurality of channel-ways or tire-supporting grooves $b\ b$, each for the reception of a suitable tire C, which may be held in said channel-ways or grooves by means of the usual wires $b^4\ b^4$. The outer walls $b'\ b'$ of the channel-ways or grooves $b\ b$ extend part way of the height of the tires C C, retained therein, and have upper rounded corners $b^6\ b^6$, which when the rubber of the tire is compressed by contact with the ground serve to provide a smooth rounded surface against which the compressed rubber of the tire may bear without danger of cutting. The channel-ways or grooves $b\ b$ are separated by the intermediate wall $b^2$, the top $b^5$ of which extends considerably higher than the tops $b^6\ b^6$ of the side or outer walls $b'\ b'$. In fact the top of the intermediate wall $b^2$ is only a short distance below the tops of the tires C C. The distance of the top $b^5$ of the intermediate wall $b^2$ below the plane of the top surface of the tires C C at any point is such that with the character of tire in use and under ordinary conditions of load, speed, and road-bed the entire weight upon the wheels will be borne by the yielding tires C C; but should the conditions of use—such as overload, rough or uneven road-bed, and excessive speed—tend to throw excessive wear upon the tires as the wheels turn under the action of the motor; then the top $b^5$ of the intermediate wall $b^2$ will come into the plane of the tops of the tires as they are compressed and contacting with the ground will act as a supplemental tread-surface to take up part of the excessive wear tending to destroy the rubber tires, or should either or both of the tires C C become ruptured or be thrown from the wheel the supplemental tread-surface $b^5$ will still support the vehicle in running condition. It is to be noted that the supplemental tread-surface $b^5$ is disposed between the tires C C, from which it follows that it acts in the performance of its supplemental function for both tires, and being disposed in the circumferential center of the wheel separating a plurality of tires no racking or injurious side strains are imparted to the wheel when the supplemental tread-surface comes into action, and being so located it may be made of a size and form to support the entire weight of the vehicle should both tires become unserviceable. In order to provide suitable spaces for the reception of the rubber of the tire as the latter is compressed, I form in each side of the intermediate wall $b^2$ the supplemental or expansive grooves $b^3$ and provide them with rounded surfaces, so that as the tire is compressed it may enter these grooves to some extent and not be cut.

While I deem the use of a plurality of tires desirable, as shown in the preferred construction of Fig. 1, and it is evident that more than two may be used if desired, I have shown a modification of the invention in Fig. 2, wherein one tire only is employed. In this construction the tire-support B' is formed with a single groove $b$, the tire C being held therein by the usual wire $b^4$; but as there is no central or intermediate wall in this construction I form one of the side walls $d$ of sufficient height, so that its upper surface $d'$ will occupy the same relative position with respect to the top or circumference of the single tire that the supplemental tread-surface $b^5$ bears to the tops or circumferences of the plurality of tires C C, and I provide the expansion-groove $d^2$ in the upwardly-extending side wall $d$ to provide for the material of the tire as it is compressed. Thus in either case of a single or plurality of tires I have provided a construction in which there is a supplemental tread-surface extending or projecting beyond other parts of the tire-holder and which is called into play only when the conditions of use bring extra wear upon the tire, and as soon as such conditions change and normal running is resumed the supplemental tread-surfaces are placed out of action by the expansion of the tire, and the latter then supports the entire weight.

Having thus described my invention, what I claim, and desire to secure by Letters Patent, is—

1. In a vehicle-wheel, the combination of a felly, a tire-support mounted thereon and provided with projecting walls, a tire carried by the support between said walls, one of said walls being extended circumferentially beyond the remaining walls and constituting a supplemental tread-surface.

2. In a vehicle-wheel, the combination of a felly, a tire-support mounted thereon and provided with projecting walls, a tire carried by the support between said walls, one of said walls being extended circumferentially beyond the remaining walls and constituting a supplemental tread-surface, said extended wall being provided with an expansion-groove.

3. In a vehicle-wheel, the combination of a felly, a tire-support mounted thereon and provided with a plurality of tire-supporting grooves, a plurality of tires carried thereby, the intermediate wall between two of said tire-supporting grooves being extended circumferentially beyond the outer walls of the grooves and constituting a supplemental tread-surface disposed between the tires.

4. In a vehicle-wheel, the combination of a felly, a tire-support mounted thereon and provided with a plurality of tire-supporting grooves, a plurality of tires carried thereby, the intermediate wall between two of said tire-supporting grooves being extended circumferentially beyond the outer walls of the grooves and constituting a supplemental tread-surface disposed between the tires, the sides of the intermediate wall being provided with expansion-grooves.

In testimony whereof I affix my signature in presence of two witnesses.

ALEXANDER TURKINGTON.

Witnesses:
ARCHIBALD YOUNG,
AUSTIN HARVEYCUTTER.